United States Patent [19]
Schröder

[11] Patent Number: 5,388,955
[45] Date of Patent: Feb. 14, 1995

[54] HIGH-SHELF SYSTEM STORE FOR THE STORAGE AND THE REMOVAL FROM THE STORE OF ROLL-SHAPED MATERIAL, MORE PARTICULARLY PAPER ROLLS, HAVING TRACKS ARRANGED IN PAIRS FOR STORING PAPER ROLLS THEREUPON

[75] Inventor: Niels Schröder, Pinneberg, Germany

[73] Assignee: Copla Förder-und Lagertechnik Gesellschaft für Anlagenbau mbH, Berlin, Germany

[21] Appl. No.: 897,687

[22] Filed: Jun. 12, 1992

[30] Foreign Application Priority Data

Jun. 12, 1991 [DE] Germany ............... 9107229[U]

[51] Int. Cl.$^6$ ............................................. B65G 1/06
[52] U.S. Cl. ............................. 414/279; 414/267; 414/284; 414/911
[58] Field of Search ............ 414/279, 281, 284, 908, 414/911, 341, 267; 211/59.4, 13; 248/127, 146

[56] References Cited

U.S. PATENT DOCUMENTS

| | | | |
|---|---|---|---|
| 3,091,348 | 5/1963 | Neuhauser | 211/59.4 X |
| 3,924,300 | 12/1975 | Hilger et al. | 414/279 X |
| 3,973,685 | 8/1976 | Loomer | 414/284 X |
| 3,978,995 | 9/1976 | Zollinger et al. | 414/279 |
| 4,268,207 | 5/1981 | Pipes | 414/281 X |
| 4,459,078 | 7/1984 | Chiantella et al. | 414/284 X |
| 4,971,508 | 11/1990 | Miyahara et al. | 414/911 X |
| 5,002,449 | 3/1991 | Kita et al. | 414/279 X |
| 5,054,986 | 10/1991 | Hirano et al. | 414/284 X |
| 5,067,871 | 11/1991 | Hilber | 414/911 X |

FOREIGN PATENT DOCUMENTS

| | | | |
|---|---|---|---|
| 833988 | 5/1960 | United Kingdom | 414/281 |
| 167774 | 3/1965 | U.S.S.R. | 414/908 |

*Primary Examiner*—David A. Bucci
*Attorney, Agent, or Firm*—Anderson Kill Olick & Oshinsky

[57] ABSTRACT

For the storing of paper rolls in high-shelf system stores and for the guidance of paper roll transporting cars, tracks disposed in pairs are provided which, for the accommodation of great weights, possess an approximately U-shaped cross-sectional configuration with a lower chord, an upper chord (180) and a web interconnecting both chords, which, proceeding devoid of any bends linearily and, with the aid of connections (183), is connected to a plurality of vertical supporting girders (184) disposed at a distance from each other and connected to the crossgirder (12) of the framework structure of the store, wherein the lower chord is formed by a leg (187) with a horizontally proceeding section forming the support for the paper roll transporting car and a section adjoining the latter which proceeds vertically and parallelly to the web, wherein the horizontal leg section is supported on and the vertical leg is supported against an angle section (188) connected to the vertical supporting girder (184) and the crossgirder (12) having a height which, in comparison with the length of the vertical track leg section, has a greater height, wherein the upper chord (180) is formed by a leg which proceeds obliquely in the direction of the support of the lower chord.

20 Claims, 12 Drawing Sheets

HIGH-SHELF SYSTEM STORE FOR THE STORAGE AND THE REMOVAL FROM THE STORE OF ROLL-SHAPED MATERIAL, MORE PARTICULARLY PAPER ROLLS, HAVING TRACKS ARRANGED IN PAIRS FOR STORING PAPER ROLLS THEREUPON

The present invention relates to a high-shelf system store for the storage and the removal from the store of roll-shaped material, more particularly of paper rolls, having tracks arranged in pairs for the storage of paper rolls thereupon which, while in the lying position, can be supplied by a roll seizing means, via a conveying path to the high-shelf system store with shelf bays, having tracks that are arranged in pairs for the accommodation of paper roll transporting vehicles, wherein each track of the pair of tracks attached to crossgirders of the framework structure of the store possesses an approximately U-shaped cross-sectional profile section with a web interconnecting the lower chord and the upper chord.

BACKGROUND OF THE INVENTION

Two storing techniques for the storing of paper rolls are known, viz. the stacker truck store and the crane store. In the piler, the paper rolls, after having come out from the packaging machine or the cutter, are aligned and seized by the stacker truck with the aid of a clamping means. With the aid of the stacker truck, the paper roll is then transported to the storage site, upon which mostly several paper rolls are stacked so as to be disposed in a tower-like fashion on top of each other. In this type of storage technique, a damage hazard for the paper rolls cannot be avoided owing to the clamping means employed. A further risk of damage exists due to an oblique stacking up of the paper rolls which may suffer damage within their edge areas. The tower-like stacking upon each other of several paper rolls contributes to an accident hazard. In the crane store, the paper rolls are likewise aligned after having left the packaging machine or the cutter and seized with the aid of a crane system with vacuum hoisting means. The crane system conveys the individual rolls to the storage site, following which the paper rolls are stacked on top of each other in a tower-like manner.

Since a loading of a railroad car or a truck with paper rolls is at all times effected with the paper rolls assuming a lying position, the aforestated conventional storage systems always have to comprise a setting up into an upright position and a relocation of the paper rolls in order to fulfil their function.

From the DE-GM 88 13 290.0, a track disposed in pairs for accommodating paper rolls in stores is known, in which case each track of the pair of tracks is provided with an upper supporting section area for storing a paper roll and with a section area located therebeneath for the formation of a running area for transport vehicles. In this case, the upper section area is cross-sectionally constructed in an approximately V-shaped manner; the external sides of each leg of the V which forms the supporting area for the paper roll. The leg of the V passes into an assembly and guide web which points downwardly when assuming the position of use, to which adjoins the further section area forming the runway track for the paper roll transporting vehicle, in which the free end of the V-leg forming the paper roll supports, is constructed so as to be folded back inwardly in the direction of the assembly web; the free end of the section area forming the running track is in this case constructed so as to be folded over in the downward direction. With a track constructed in this manner arranged in pairs it is intended to render possible the storage of heavy, essentially circular objects, such as large paper rolls having varying diameters.

Furthermore, from the DE-GM 88 13 142.4, a cold-rolled section girder having a lower chord and an upper chord and with a bent web interconnecting the lower chord and the upper chord is known which adjoins the lower chord at an angle of 80° through 100°, which, within its center area toward the side on which the lower chord is located, is bent and, in the bend, the bottom portion of the web adjacent to the lower chord, together with the top portion of the web, forms an obtuse angle, while the upper chord adjoining the top portion of the web, in the opposite direction of the Lower chord, but, in comparison with an imaginary parallel plane determined by the lower chord is constructed so as to ascend obliquely and, within its area adjoining the top portion of the web, is at an acute angle of 5° through 50° to this parallel plane, while a lip is formed onto the upper chord and, onto the lower chord, a further lip is formed. This cold-rolled girder is constructed in such a way that its profile—when viewed in the cross-section—is particularly suitable for absorbing a load diverging from the perpendicular when favorable tension conditions prevail in the cold-rolled girder; in addition, it is intended that it is capable, while empoloying economical material resources, of absorbing both smaller as well as more substantial bearing loads.

Due to the great weight of the paper rolls of 7½ tons, a sagging of thusly constructed tracks or cold-rolled girders is unavoidable, in which case a sagging of the section webs as well as a sagging or bending takes place already in such a way that, when subjected to a great load, the tracks, which, after all, are combined in pairs, approach each other when their webs sag simultaneously so that a change in the bearing surface of the paper rolls may take place in such a way that a safe storage and support of the paper rolls is no longer ensured. Since the tracks and cold-rolled section girders, in their lower chords, are constructed in the form of supports for the paper roll transporting cars so as to be able, with their transporting cars, to convey the paper rolls into the individual shelf compartments of the high-shelf system store and to deposit them there or, in order to be able to seize the paper rolls and remove them from the shelf bays, in the event of a change in the section due to compressive stresses acting upon the same and the sagging connected therewith, the danger exists of the supports for the transporting cars becoming deformed and changing in such a way that the travel movements of the transporting cars are impaired.

It is the object of the invention to provide a high-shelf system store for the storage of and the removal from the store, more particularly of paper rolls, in which it is possible for the paper rolls to be delivered in a lying position, to be supplied in a lying position, to be accommodated in a lying position and to be taken out from the high-shelf system store in a lying position so as to render possible in this manner a lying mode of conveying and storing so that the paper rolls are displaced in the most gentle and careful way. Furthermore, it is the object of this invention to provide a track for high-shelf system stores which, even when absorbing very substantial weights, remains unchanged in its configuration and does not become deformed so that, owing to the high degree of inherent stability of the track, the travel motions of the paper roll transporting cars are not impaired, in that, independently of the size of the diameter of the paper rolls, a large supporting area for the paper rolls deposited upon the tracks is maintained even in the event of being subjected to a great weight load, and in that the travel section of the paper roll transporting cars receives an additional stiffening.

This technical problem is solved by the combination of features.

SUMMARY OF THE INVENTION

A high-shelf system store constructed in such a way according to the invention renders possible the conveying and storing of paper rolls in a lying, i.e. a horizontal, position. A setting upright of the paper rolls in order to bring these into a vertical position is avoided and no longer necessary. The paper rolls supplied in the lying position are conveyed in the lying position to all the individual shelf bays of the high-shelf system store and stored in the lying position in the individual shelf bays, while the removal of the paper rolls and their transporting away are effected with the paper rolls in the lying position. The advantage resulting from the use of a thusly constructed high-shelf system store resides in that the paper rolls which arrive at the store in the lying position from the roll packaging machine via a conveying track, are accepted there in the lying position, are transported within the store by means of the store operating equipment in the lying position and are stored or taken out from the store and handed over to the store exit area likewise in a lying position. This lying way of being conveyed and stored offers the decisive advantage that the paper rolls are being moved and handled in a gentle manner. To this is added the circumstance that, with the aid of the high-shelf system store, a compact, space-saving storing of paper rolls is possible, the operation of the store being carried out automatically and a gentle treatment of the paper rolls is given. A further advantage consists in that the placing in the store and taking out from the same of the paper rolls is effected without that recourse being had to any auxiliary means, such as pallets or the like. Each arriving paper roll is accepted in the lying position and this in the same way in which the paper roll comes from the packaging department, as a result of which no tipping, tilting and setting upright is necessary any longer. On account of the construction of the shelf bays of the high-shelf system store, it is possible for paper rolls possessing different diameters and widths being stored in series. Since it is possible for loading units of up to 3100 mm load alternation to be entered into the store or removed from the same, a very high performance is possible to be achieved. By employing e.g. eighteen shunting wagons with one paper roll transporting car each, it is possible without any difficulty to perform 160 storage entries or 240 removals from the store of paper rolls per hour. In lieu of the known shelf conveyers and vehicles extending over the entire store height, the operating of the store is taken care of by small shunting wagons with mounted paper roll transporting cars which are installed in every store plane and constructed exclusively for horizontal travel and for picking up or putting down the loads. The use of a larger number of vehicles renders a high turnover possible. Operations embracing both putting paper rolls into the store as well as taking them out from the store can be carried out in parallel. As a store aid, a sectional store construction incorporated into the shelf bays or store channels may serve. To this is added the circumstance that the store concept provided by the high-shelf system store is a so-called "chaotic store" since paper rolls possessing every roll diameter and every roll width can be put into storage in every shelf bay or store channel.

A track employed in this high-shelf system store which is used disposed in pairs possesses a great strength and rigidity. In its construction, the track is designed in such a way that it is also capable of accommodating storage material whose weight exceeds that of paper rolls. It is for this reason that the track is also suited for accommodating great weights such as exist e.g. in round iron or steel bars having large diameters so that it is also possible to deposit high-weight round iron bars in a store where tracks constructed according to the invention are employed. The track section does not sag even when acted upon by the stress of great loads. To this is added a high degree of bracing of the traveling section or the bearing surface of the paper roll transporting car. In addition, the track section absorbs the line loads transferred from the paper rolls without undergoing any change in the process. Even when great track lengths are involved, no distortions do occur when subjected to a load. In this connection, the attachment of the track section within the upper area of the vertical supporting crossbeam is of special importance which, at the bottom, is secured to the crossgirder of the supporting framework of the high-shelf system store. The manufacture of the track section is simple and, consequently, economical, since the profiling of the webs of the upper chord and of the lower chord is obtained by simple chamfering.

Advantageous embodiments of the invention are characterized in the subclaims.

BRIEF DESCRIPTION OF THE DRAWINGS

Embodiment examples of the invention are explained in greater detail below with the aid of the drawings. Thus

DETAILED DESCRIPTION OF THE PREFERRED EMBODIMENT

Figure 1:
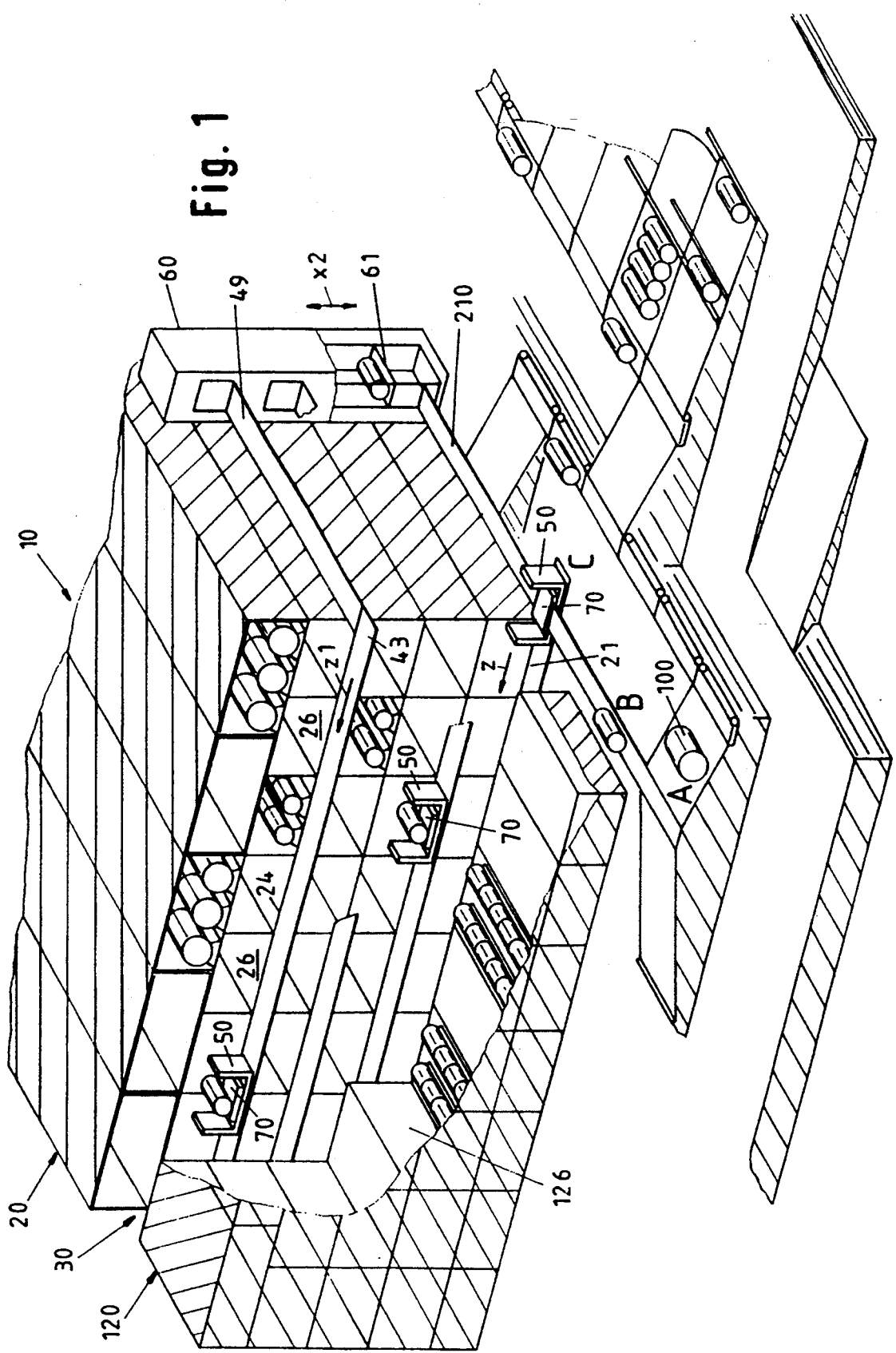
FIG. 1 shows, in a diagrammatical view, a high-shelf system store comprising shelf portions, in which one shelf portion is only depicted in sections.
Figure 2:
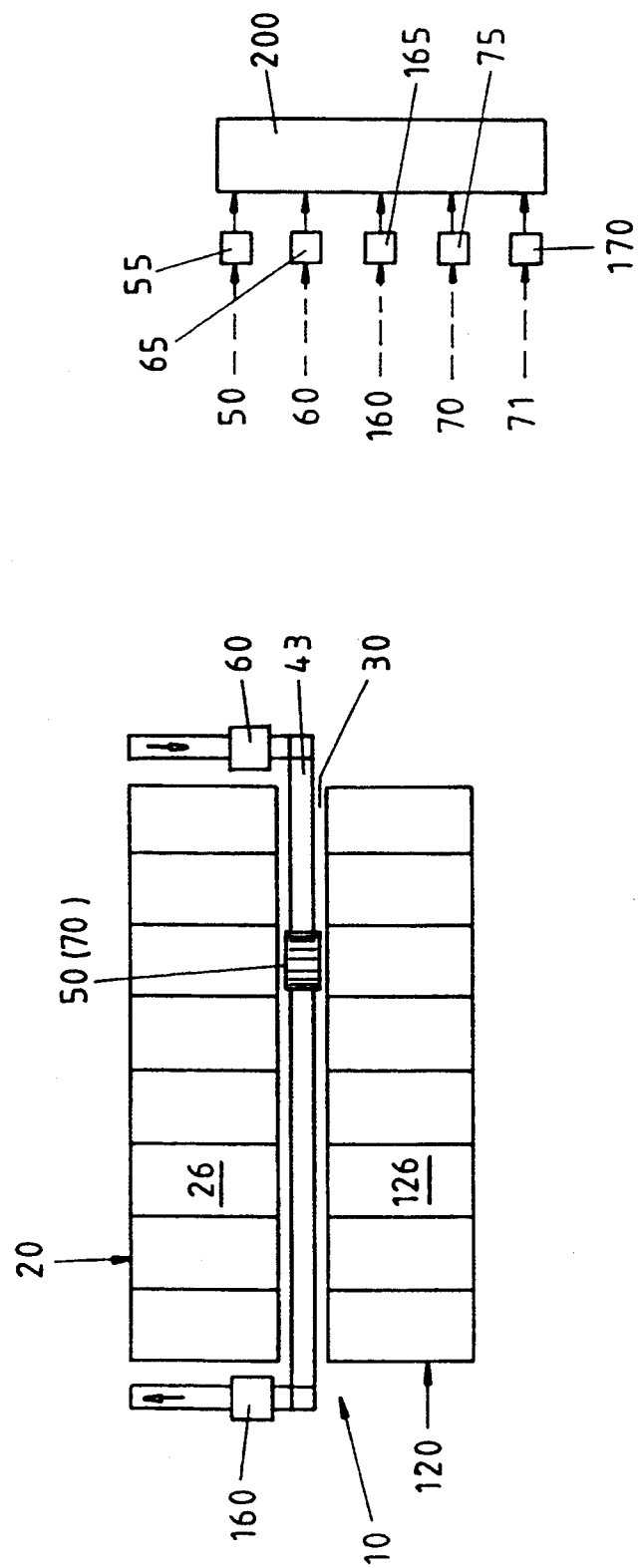
FIG. 2 shows, in a view from the top, the high-shelf system store according to FIG. 1 comprising two shelf portions disposed on both sides of a distribution shaft.

The high-shelf system store illustrated in FIGS. 1 and 2 and identified with 10 for the storage and the removal from the store of roll-shaped material, more particularly paper rolls 100 comprises two shelf portions 20,120 which, while forming a distribution shaft 30, are disposed so as to be located opposite each other, while the width of the distribution shaft 30 corresponds approximately to the length of a paper roll 100.

Figure 5:
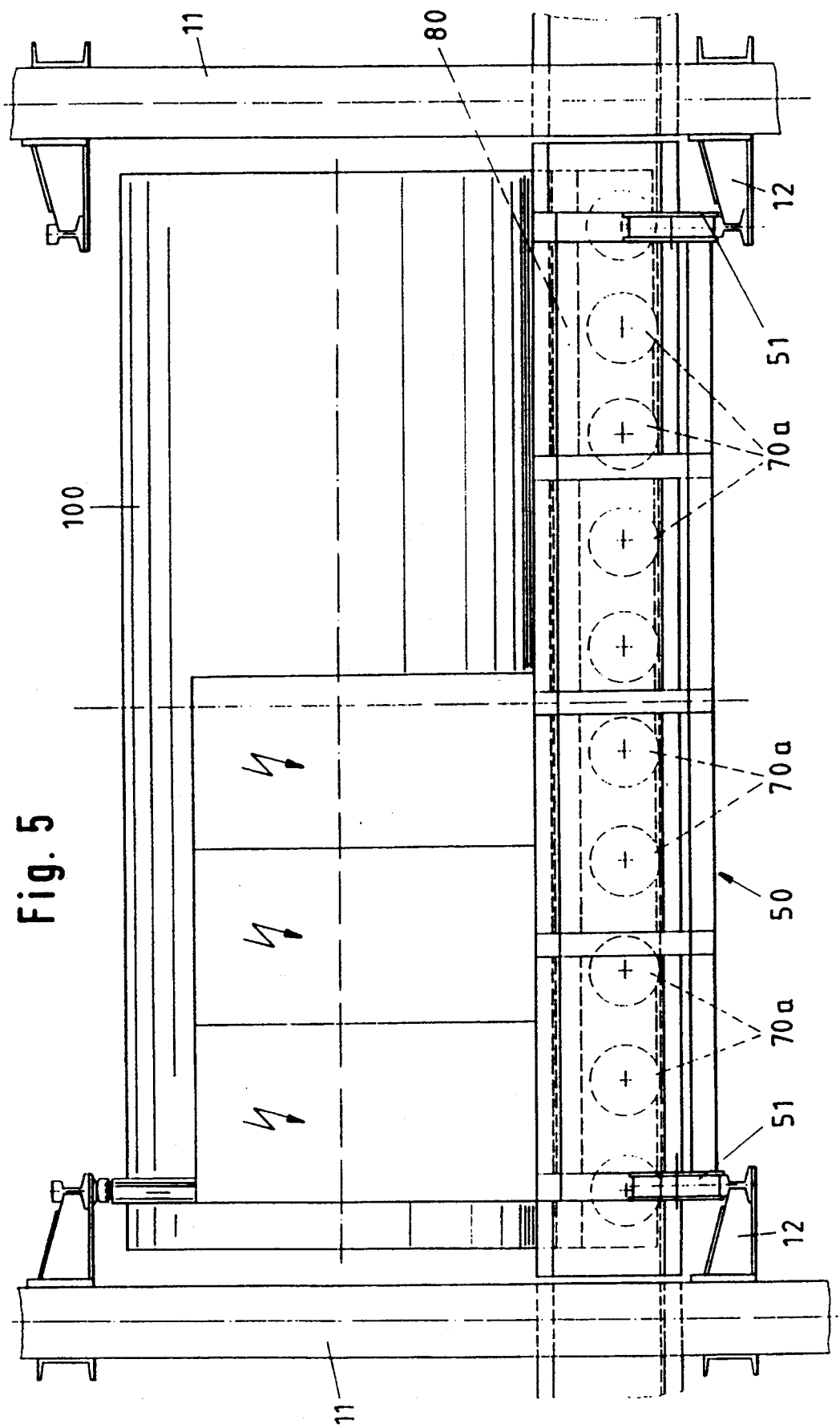
FIG. 5 shows, in a front view, the shunting car according to FIG. 4.

Each shelf portion 20,120 is comprised of vertical shelf columns 11 which are interconnected by means of horizontal crossgirders 12 so that, in the individual shelf portions 20,120, individual floors 21,22,23,24,25 are formed. In the embodiment example shown in the FIGS. 1 and 2, each shelf portion 20,120 has five floors, while the number of floors depends on the, in each case, desired or required storage capacity of the high-shelf system store (FIG. 5). Since the high-shelf system store 10 is constructed in the skeleton mode, the possibility exists of enlarging each shelf portion 20,120 laterally or vertically if the existing storage capacity does prove inadequate or an expansion becomes necessary. In this case it is possible for the individual shelf portions 20,120 to be prefabricated in the form of structural members so as to make it possible for them to be then modularly disposed adjacently and/or superposedly. The framework structure forming the high-shelf system store is preferably disposed on a baseplate.

Figure 6:
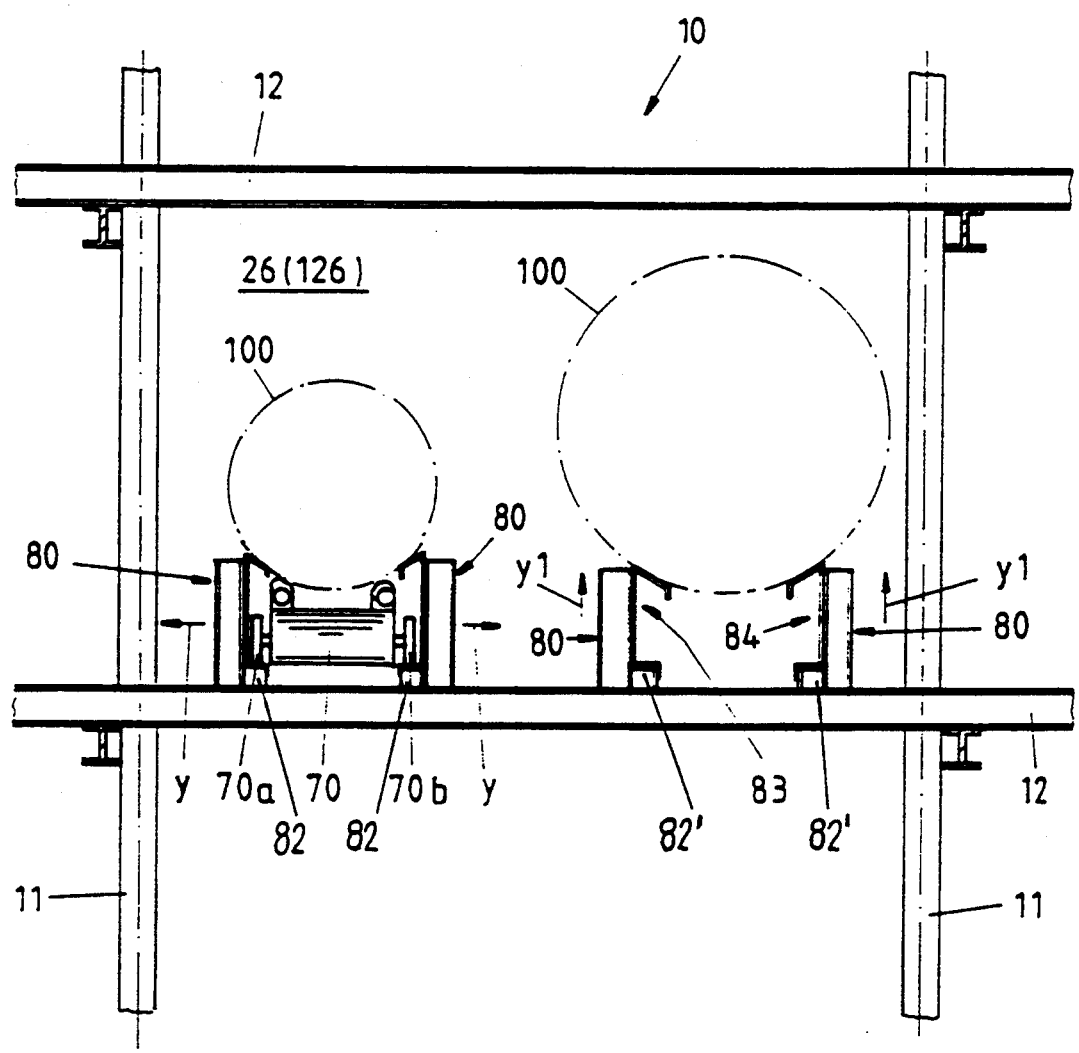
FIG. 6 shows, in a view from the front, a shelf bay with two paper rolls stored therein.

The floors 21 through 25 of each shelf portion 20,120 are not staggered relative to each other, but the floors of both shelf columns 11 are arranged so as to be spaced a distance apart from each other so that, in each of the two shelf portions 20, 120, a plurality of adjacently or superposedly disposed shelf bays or compartments is formed which are identified with 26, 126. The dimensions of the individual shelf bays 26,126 which, with their front-end openings 26a are allocated to the distribution shaft 30, are selected in such a way that one or several paper rolls lie parallel to the longitudinal direction of each shelf bay 26,126. The height of each shelf bay 26,126 depends on the diameter of the paper rolls 100 to be stored; the height of each shelf bay 26,126 will preferably depend on the largest diameter of the paper rolls to be stored so that, ultimately, it is also possible to store in each shelf bay paper rolls possessing different diameters (FIG. 6).

According to the embodiment example depicted in FIGS. 1 and 2, the high-shelf system store 10 comprises two shelf portions 20,120 arranged on both sides of the distribution shaft 30. However, the possibility also exists of providing a high-shelf system store 10 comprising only one shelf portion 20, as is apparent from FIG. 3. This high-shelf system store 10 comprising solely one shelf portion 20, with regard to its shelf portion 20, is connected in accordance with the shelf portions 20,120 of the high-shelf system store 10 illustrated in the FIGS. 1 and 2.

The length of each shelf bay 26,126 of both shelf portions 20, 120 of the high-shelf system store 10 corresponds to the multiple of the length of a paper roll 100. In which connection, however, it is also possible to provide a shelf bay construction according to which each shelf bay has a length which corresponds to the length of a paper roll 100. The shelf portions 20,120 disposed on both sides of the distribution shaft 30 are arranged in such a way that they are located opposite each other so that the front-end openings 26a of the individual shelf bays 26,126 of the one shelf portion 20 correspond to that of the other shelf portion 120.

In each floor 21,22,23,24,25 of each shelf portion 20,120, within the area of the front-end openings 26a of each shelf bay 26,126, a conveying path proceeding horizontally and transversely to the longitudinal direction of the shelf bay for at least one shunting wagon 50 is disposed. In the embodiment example depicted in FIG. 3, one conveying path each 40,41,42, 43 is allocated to the floors 21,22,23,24. The conveying path necessary for the floor 25 is not shown in the drawing.

The number of conveying paths for these shunting wagons depends on the number of individual floors. If the high-shelf system store 10 comprises only one shelf portion 20 or 120, in that case the conveying paths 40 through 43 are disposed so as to proceed within the area of the openings 26a of the individual shelf bays 26 or 126. If, on the other hand, the high-shelf system store 10 comprises the two shelf portions 20,120, then the conveying paths 40 through 43 are disposed within the distribution shaft 30 constructed between the two shelf portions 20,120. Since no vertical shunting movements are executed within the area of the distribution shaft 30, the conveying paths 40 through 43 are rigidly connected to the framework structure of the high-shelf system store 10.

Figure 3:
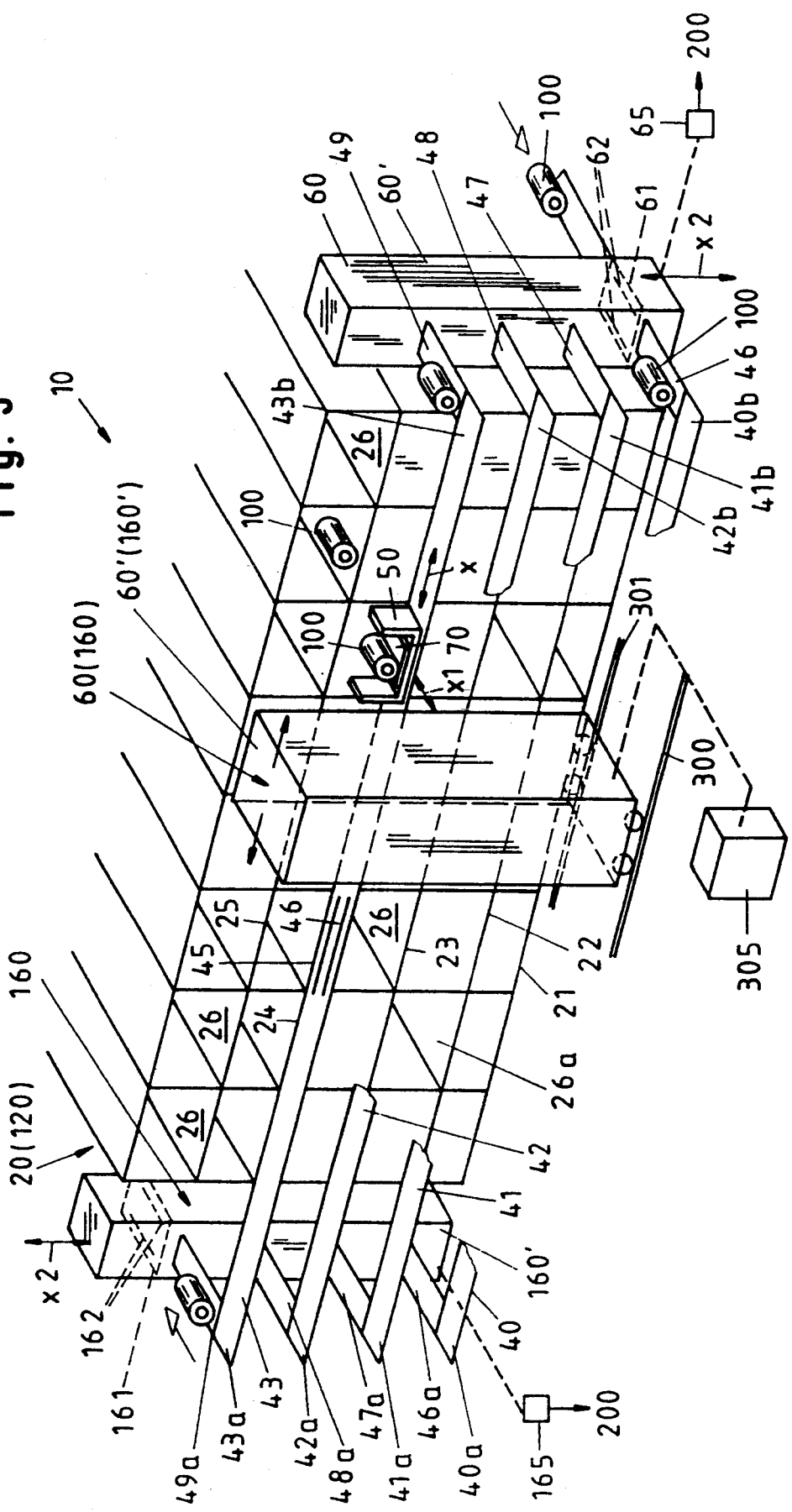
FIG. 3 shows, in a diagrammatical view, a high-shelf system store comprising only one shelf portion.

Each conveying path 40,41,42,43 is provided with runway tracks 45,46 running parallel to each other for guiding the shunting wagons 50 (FIG. 3).

The conveying paths 40 through 43 in the embodiment depicted in FIG. 3 terminate with their two ends 40a,41a,42a,43a and 40b,41b,42b,43b in the elevators 60,160, of which each elevator is comprised of an elevator shaft 60',160' of a framework structure with a raisable and a lowerable conveying platform 61,161, while each conveying platform 61,161 is constructed in such a way that the same is capable of accommodating at least one shunting wagon 50. For this, each conveying platform 61, 161 is likewise provided with a pair of runway tracks 62,162 for accommodating the shunting wagons 50, in which case, however, the runway tracks 62,162 of each conveying platform 61, 161 can be brought into connection with the runway tracks 45, 46 of each conveying track 40,41,42,43 in such a way that the shunting wagons 50 can be made to travel from the conveying paths to the conveying platform 61,161 of the elevators 60, 160 when the conveying platform is displaced into the area of the individual conveying paths 40 through 43 so that a continuous shunting wagon passage or crossing area is obtained.

It is possible, however, for each conveying platform 61,161 to possess a length which corresponds to a multiple of the length of a shunting wagon 50 so that, for example, each conveying platform 61,161 is capable of accommodating two or more shunting wagons 50 standing in tandem arrangement in order to be able to supply the shunting wagons 50 to the conveying paths 40 through 43 of the individual high-shelf system store floors 21 through 25. The delivery of the paper rolls 100 to the elevators 60,160 is effected with the aid of conveyer belts 210 (FIG. 1).

According to FIG. 3, the two elevators 60,160 are disposed at the front end of the shelf portion 20. If the high-shelf system store comprises two shelf portions 20,120, in that case the possibility exists of disposing the elevators 60,160 at the ends of the distribution shaft 30, it being also possible, however, to select other locations for the elevators 60,160. If the elevators 60,160 are disposed at the front ends of the shelf portion 20 (FIG. 1), then the conveying paths 40 through 43 are extended as far as into the front ends of the shelf portion 20 and terminate in the elevators 60,160 disposed on the front sides of the shelf portion 20. In this case it is possible to construct these conveying paths 40 through 43 in such a way that the shunting wagons 50 can also be accommodated by the conveying platforms 61,161 of the two elevators 60, 160. However, according to a further embodiment, the conveying paths 40 through 43 proceeding within the area of the front end openings 26a of the shelf bays 26,126 of the shelf portions 20,120 serve for the displacement of the shunting wagons 50, whereas in that case those conveying path sections which proceed within the area of the front ends of the shelf portion 20, as conveying path for paper roll transporting cars 70 which can be mounted on the individual shunting wagons 50, which is going to be dealt with yet in greater detail hereinafter. The conveying path sections proceeding within the front end area of the shelf portion 20 are, in FIG. 1, identified with 46, 47,48,49 and 46a,47a,48a,49a (FIG. 3).

The vertical displacement of the conveying platform 61,161 of the two elevators 60,160 is preferably effected with the aid of electromotively operated driving means which are indicated at 65,165. The direction of displacement of the two conveying platforms 61,161 takes place in the direction of the arrows X2 (FIG. 3). However, the possibility also exists of providing, in lieu of two elevators 60,160 disposed at the front ends of the shelf portion 20, a single elevator into which the conveying paths 40 through 43 likewise terminate with or without their conveying sections 46 through 49 and 46a through 49a.

Figure 4:
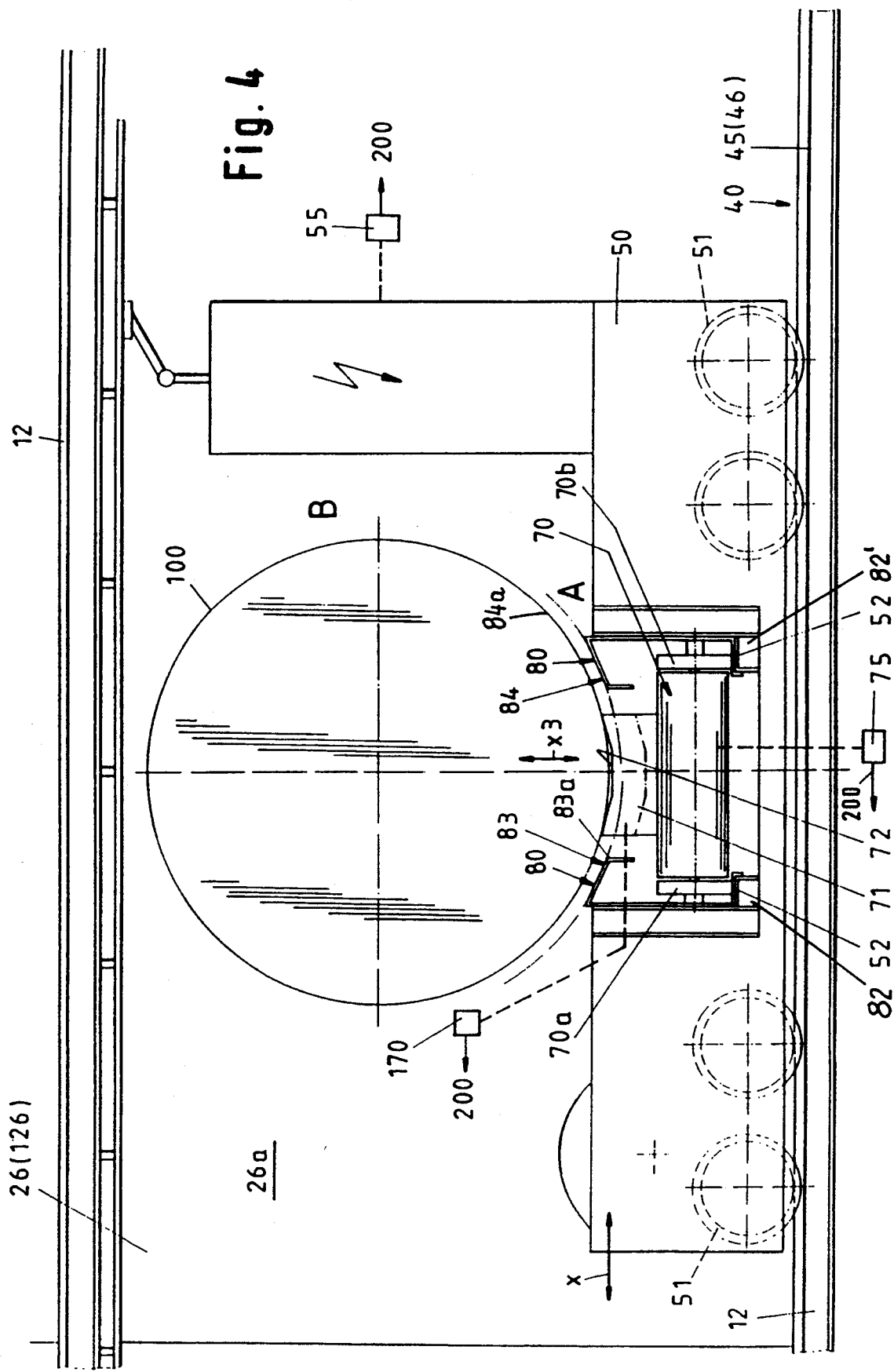
FIG. 4 shows, in an enlarged side elevation, a shunting wagon having a paper roll transporting car carrying a paper roll mounted on it.

Each shunting wagon 50 is provided with a paper roll transporting car 70 which proceeds transversely to the movement of advance of the shunting wagon which is mounted in piggyback fashion on the shunting wagon 50 (FIG. 4). In order to achieve as low as possible an overall length, the shunting wagon is provided at its center with a recess in which the paper roll transporting car 70 comes to stand. Within the area of the location of the paper roll transporting car 70, the shunting wagon is provided with a pair of runway tracks 52, upon which the paper roll transporting car 70 is supported with its runners 70a,70b and is guided in such a way that a displacement of the paper roll transporting car 70 in the direction of arrow X1 is possible (FIGS. 3 and 5). The shunting wagon 50 itself is fitted with runners in order to be able to travel on the runway tracks of the conveying paths 40 through 43.

The paper roll transporting car 70 is provided with a raisable and lowerable paper roll carrying plate 71. The lifting movement of said paper roll carrying plate 71 takes place in the direction of the arrow X3 (FIG. 4). The driving means of the paper roll carrying plate 71, in order to be able to displace the same vertically, is accommodated inside the housing of the paper roll transporting car 70 and is identified with 170. Apart from an electromotive drive it is also possible to employ a hydraulic lifting means. The driving means of the shunting wagon 50 is indicated at 55 and the driving means of the paper roll transporting car 70, at 75. All driving means 55,65, 165, 75 and 170 are combined into a program control system 200, into which the individual shelf bays 26,126 are stored as well, this will be dealt with yet in greater detail hereinafter (FIG. 2).

The paper roll carrying plate 71 of the paper roll transporting car 70 has a bearing area 72 for the individual paper rolls 100, which is constructed in the form of a graduated circle, that is to say, it is constructed in such a way that the paper roll bearing area 72 adapts to the circumference of the paper roll 100 so that the same is securely retained in the trough formed by the paper roll bearing area 72 (FIG. 4).

Each shelf bay 26,126 is provided with a paper roll supporting beam 80 proceeding in the longitudinal direction of the shelf bay, which is disposed stationarily in the framework structure of the high-shelf system store. This paper roll supporting beam 80 is provided with running tracks 82,82' disposed on both sides for the paper roll transporting car 70. The two running tracks 82,82' may be included on both sides of the paper roll supporting beam 80, but also in the structural design of the paper roll supporting beam 80, as is shown in FIGS. 4 and 6.

The paper roll supporting beam 80 comprises two tracks 83,84 disposed at a distance from each other, whose supporting areas 83a,84a for the paper roll 100 are constructed so as to proceed inclinedly toward each other so that a storage area is obtained which corresponds approximately to the course of a section of the circumference of a paper roll so that, with the aid of the supporting areas 83a,84a, a dished or trough-shaped storage area for the paper roll 100 is provided which is then retained in a positionally secured fashion on the paper roll supporting beam 80.

Furthermore, the two tracks 83,84 of the paper roll supporting beam 80 are disposed at a distance from each other, this distance being dimensioned in such a way that it is possible to pass the paper roll carrying plate 71 between the tracks 83, 84 when the paper roll transporting car 70 with elevated paper roll carrying plate 71 is made to travel through the paper roll supporting beam 80 (FIGS. 4 and 5). The conveying position of the paper roll 100 with the paper roll carrying plate 71 of the paper roll transporting car 70 in the elevated position is indicated at B in FIG. 4, while the mounted position of the paper roll on the paper roll supporting beam 80 in a shelf bay is indicated at A.

By means of the shunting wagon 50 with mounted paper roll transporting car 70, the individual paper roll 100 on the conveying path of the respective floor is traversed into the area of the front end opening 26a of that shelf bay 26 or 126 of the shelf portion 20 or 120 in which the paper roll is to be deposited. If the shunting wagon 50 has assumed the position shown in FIG. 4, then the paper roll transporting car 70 travels with the paper roll 100 into the shelf bay, in which case the paper roll with the paper roll carrying plate 71 is raised so as to make it possible that the paper roll can be moved above the paper roll supporting beam 80 disposed in the shelf bay up to its position of deposit in the shelf bay. When the paper roll transporter 70 has assumed the deposit position intended for the paper roll, then the paper roll supporting beam 80 is lowered, to be more precise, it is lowered so far until the paper roll is seated on the tracks 83,84 of the paper roll supporting beam 80. The paper roll transporting car 70 is then made to travel with retracted paper roll carrying plate 71 into the area of the front-end opening of the shelf bay concerned and turned over to the shunting wagon 70 which has been placed in readiness in the interim, which is thus available for taking over and receiving another paper roll.

The paper roll supporting beams 80 in the individual shelf bays 26,126 may extend over the entire length of the shelf bays. However, the possibility also exists, when very long-dimensioned shelf bays are involved, of disposing shorter sections of the paper roll supporting beam 80, while maintaining the di stances from each other, so as to be located in series, and this in such a way that adequate storage and supporting areas for the paper rolls are obtained. There also exists the possibility, though, of disposing in each individual shelf bay 26,126 only one paper roll supporting beam 80 or several paper roll supporting beams 80. In the embodiment example depicted in FIG. 5, two paper roll supporting beams 80 are disposed in the shelf bay. In this embodiment example the paper roll supporting beams 80 are constructed having different dimensions so as to be able to accommodate paper rolls possessing different diameters.

Figure 7:
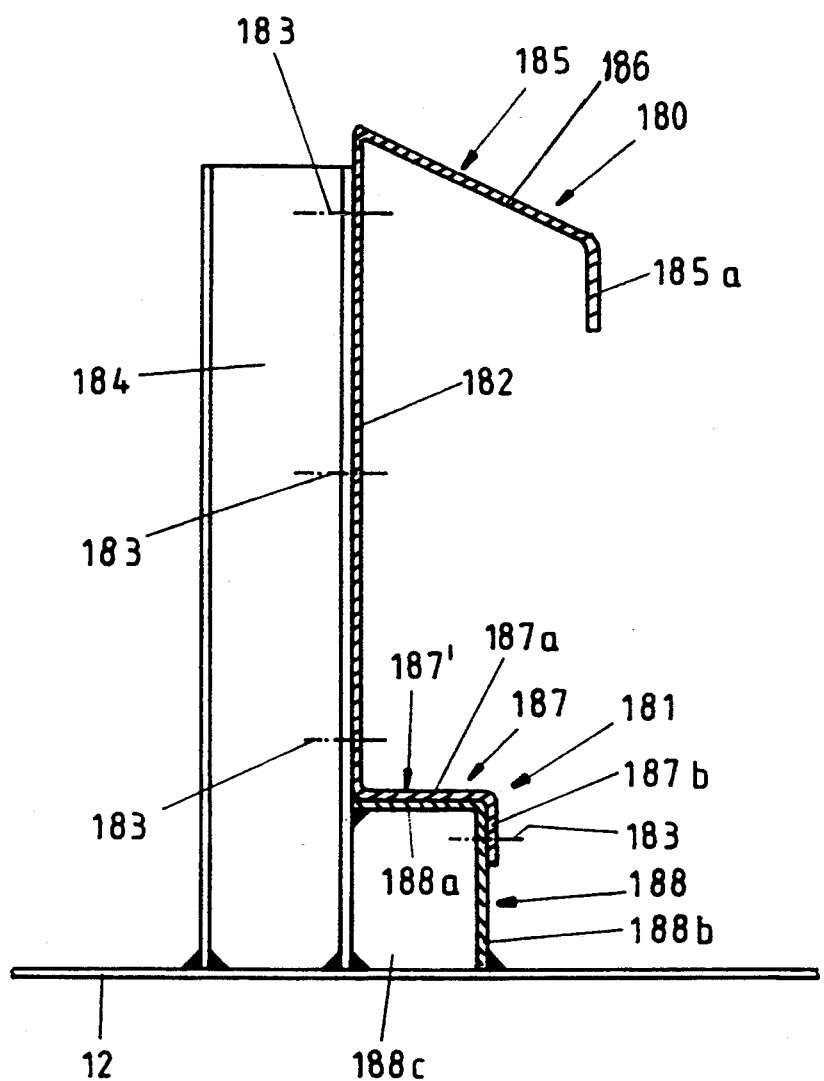
FIG. 7 shows, in a vertical section, a track for the storing of paper rolls and for accommodating the paper roll transporting car.
Figure 8:
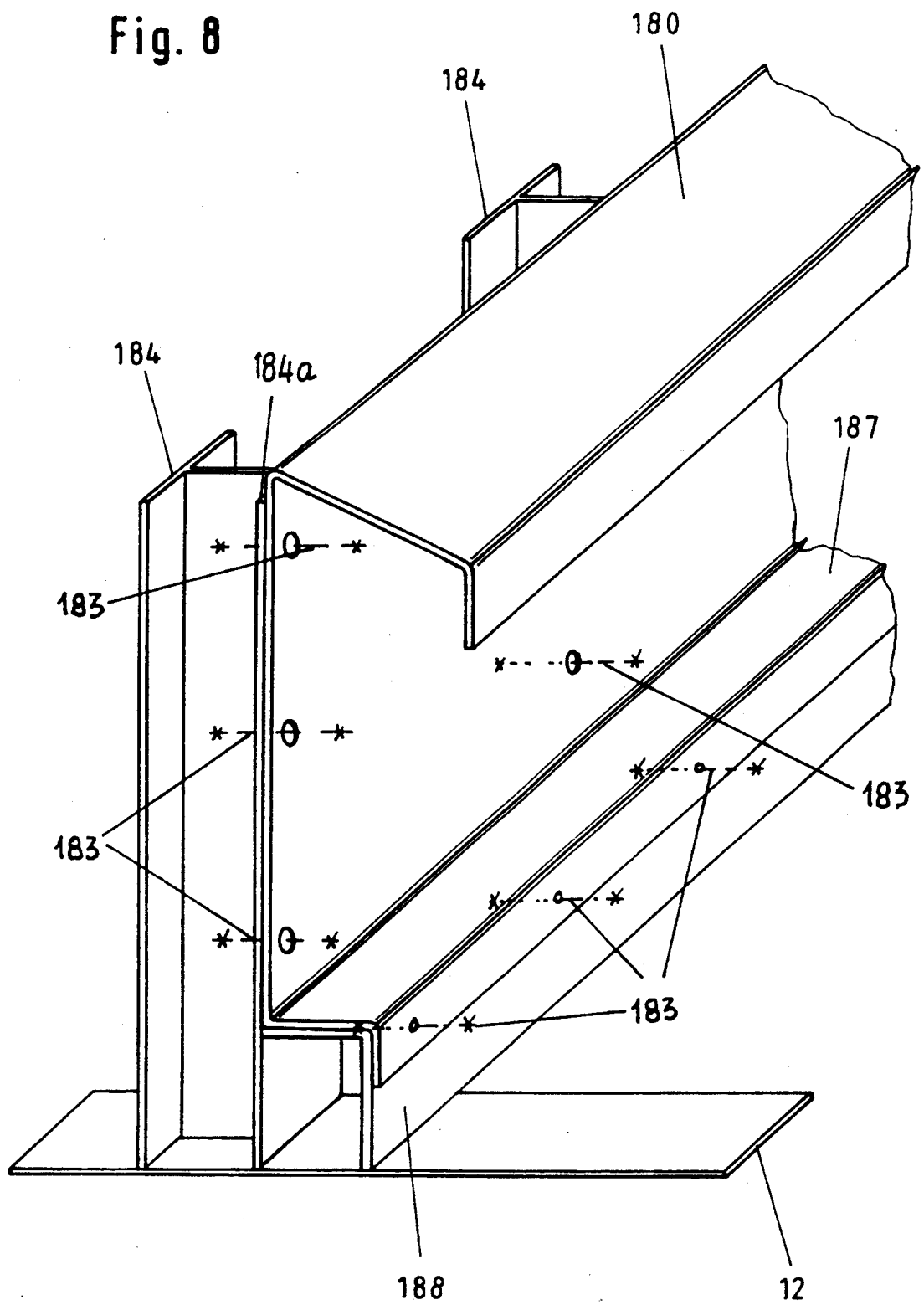
FIG. 8 shows, in a diagrammatical view, the track according to FIG. 7.

Each track 83,84 comprises, as a paper roll supporting beam and as travel support for the transporting car 70, an upper chord 180, a lower chord 181 and a vertical web 182 that interconnects the upper chord 180 with the lower chord 181. Across the length of the lower chord (181) of the track (83,84), several single angle shape sections disposed at a distance from each other are provided. The web 182 proceeds without bends and linearly, it is connected by means of screwed, riveted or welded connections 183 to a plurality of vertical supporting girders 184 that are disposed at a distance from each other and connected to the crossgirder 12. Each supporting girder 184 is constructed in the form of a double T sectional girder and, with its flanges 184a, being secured to the web 182 with connections 183, as shown in FIG. 8. What is essential in this case is that the attachment of the web 182 of the track 83,84 is effected within the upper area of the supporting girder 184. This point of attachment is of importance inasmuch as that, by means of the same, a deflection or bending over of the web 182 with its upper angled leg 185 forming the support of the paper roll is avoided, to which reference will be made yet hereinafter in greater detail (FIGS. 7 and 8). The leg 185 of the upper chord 180 of the track 83, 84 exhibits an angular position of 65° relative to the web 182.

The lower chord 181 of the track 83,84 is formed by the horizontally proceeding section 187a forming a leg 187 with a support 187' for the paper roll transporting car 70, and a section 187b proceeding vertically and parallelly to the web 182 adjoining said section 187a, in which the horizontal leg section 187a is supported on an angle section 188, while the vertical leg section 187b is likewise supported on the angle section 188 which, with its upper horizontal leg 188a, is secured to the supporting girder 184, and with its vertical leg 188, to the crossgirder 12 (FIG. 7). In this case the leg section 187a rests on the angle section 188a, while the leg section 187b rests on the angle section leg 188b. The lower chord 181 bears firmly and positively against the angle section 188. The length of the angle section 188 may correspond to that of the track 83,84, but the possibility also exists of disposing the angle section 188 by sections. It is advantageous if the two angle section legs 188a,188b are connected and braced by means of a vertical reinforcing web 188c which contributes to increasing the rigidity of the angle section.

The height of the angle section 188 is preferably greater than the length of the vertical leg section 187b of the track 83, 84.

The upper chord 180 is formed by a leg 186 which proceeds obliquely in the direction to the support 187' of the lower chord 181 and to which adjoins a section 185a which proceeds vertically and parallelly to the web 182 of the track 83,84. As shown in FIG. 8 the vertical supporting girder 184 has a length which corresponds to the sum of the length of the web 182 and of the angle section 188 or which, in comparison with the overall length of web 182 and the angle section 188, possesses a shorter length.

The leg 185 of the upper chord 180 preferably has an angular of 85° with respect to the web 182.

The two tracks 83,84 are of identical construction and are arranged so as to be located opposite each other on the crossgirder 12 in such a way as is depicted in the FIGS. 4 and 6. The support 187' together with the leg section 187b of the track 83,84 forms the travel section, i.e. the path of the paper roll transporting car 70.

Both the shunting wagon 50 as well as the paper roll transporting car 70 are provided with an electromotively operated driving motor; it is possible, however, for differently constructed driving means to be employed.

The high-shelf system store is operated in the fashion detailed below:

If a paper roll 100 is to be stored in the vacant shelf bay 26 in the floor 24 of the shelf portion 20 of the high-shelf system store 10, then this paper roll, in accordance with FIG. 1, via a system of conveyer belts or the like inserted before the same, is supplied from the position A to the conveying path 210. In the position C, within the area of the conveying path 210, a shunting wagon 50 with mounted paper roll transporting car 70 stands in readiness, and this in such a way that the paper roll can be supplied from the position B to the paper roll carrying plate 71 of the paper roll transporting car 70 direct. In this case the paper roll carrying plate 71 of the paper roll transporting car 70 preferably assumes its lowest position so as to ensure a perfect transfer of the paper roll. If it is intended to supply this paper roll on the paper roll transporting car 70 to a shelf bay on the floor 21, in that case the shunting wagon 50 travels in the direction of arrow Z on the lowermost conveying path 40 as far as into the area of shelf bay 26 in which the paper roll is to be deposited. But since, in the example shown here, the paper roll is to be supplied to shelf bay 26 on floor 24, the paper roll, lying on the paper roll transporting car 70, together with the latter, is supplied to the conveying platform 61 of the elevator 60 and, with the aid of the elevator, conveyed as far as to floor 24 and is then moved, on the conveying path section 49, to conveying path 43, on which a shunting wagon 50 is available for taking over the paper roll transporting car 70. After the transfer of the paper roll transporting car 70, the shunting wagon 50 is displaced in the direction of arrow Z1 on the conveying path 43, to be more specific, as far as into the area of the front end aperture 26a of that shelf bay 26 in which the paper roll is to be deposited. The shunting wagon 50 has then reached its final travel position within the area of this shelf bay and remains there until such time when the paper roll transporting car 70 has been displaced into the shelf bay. For the displacement of the paper roll transporting car 70 into the shelf bay, the paper roll carrying plate 71 together with the paper roll put down on the same is raised, whereupon the paper roll transporting car 70 slides into the shelf bay and is moved forward until it reaches that position in which the paper roll is deposited on the paper roll supporting beam 80. The paper roll transporting car 70 is then moved with retracted paper roll carrying plate 71 into the opening area of this shelf bay and is received by a shunting wagon placed in readiness and is once more displaced into the lowest loading position so as to be able to receive a further paper roll. In the same way in which the charging of the individual shelf bays takes place, also the taking out of the paper rolls from the high-shelf system store is effected.

The conveyance of the paper rolls 100, subsequent to having been taken over by the paper roll transporting car 70 can be effected as far as into the area of the conveying paths 40 through 43 without having recourse to the shunting wagon 50. Only once the paper roll transporting cars 70 with the paper rolls 100 have reached the conveying paths 40 through 43, a take-over from the paper roll transporting cars 70 by the shunting wagons 50 takes place, starting from which the paper roll transporting cars 70 are moved into the individual shelf bays 26,126. However, in order to be able to deposit the paper rolls, there also exists the possibility of moving, from the charging station, the paper rolls disposed on the paper roll transporting car 70 together with the shunting wagon 50 as far as into the area of the shelf bays.

The elevator shaft 60', 160' allocated to the shelf portions 20, 120 is disposed stationarily at the one end of the conveying paths 40 through 43.

In order to be able to construct the distribution shaft 30 with as small a width as possible, the elevator shaft 60',160' is disposed laterally in front of the distribution shaft, in which case the conveyer path 40 through 43 formed as conveyor belts proceeding in front of the shelf portions 20,120 are led, via conveyer belts 46 through 49 proceeding transversely to the latter in the elevator shaft 60', 160'. However, the possibility also exists of disposing the elevator shaft 60',160' inside or in front of the distribution shaft 30, in which case the elevator shaft 60',160' may be constructed so as to be either stationary or displaceable. In the latter case, the displacement in the distribution shaft 30 between the two oppositely located shelf portions 20,120 may take place in the longitudinal direction of the shelf on runway tracks 300,301 with the aid of electromotive driving means indicated at 305 (FIG. 3). It is also possible to construct the elevator shaft 60',160' in such a way that it is automotive so that a traveling out of the shelf is possible. In those embdiments in which the elevator shaft 60',160' in the distribution shaft 30 can be displaced in the longitudinal direction of the shelf, no conveyer belts 40 thru 43 are provided in the distribution shaft 30 so that the elevator shaft 60',160' can be displaced freely.

The advantage when using an elevator shaft 60',160' which is disposed so as to be displaceable within the distribution shaft 30, which possesses a height which corresponds to the height of the shelf portions 20,120, resides in a gentle handling and conveying of the paper rolls. When making use of continuous mechanical handling equipment in the form of conveyer belts 40 through 43 in front of the two shelf portions, when material to be conveyed is moved, the entire belt always has to be put into operation. To this is added the repeated transfer of the paper rolls and a possible or even necessary intermediate storage. This is dispensed with. The paper rolls are loaded once and deposited at their destination.

Figure 9:
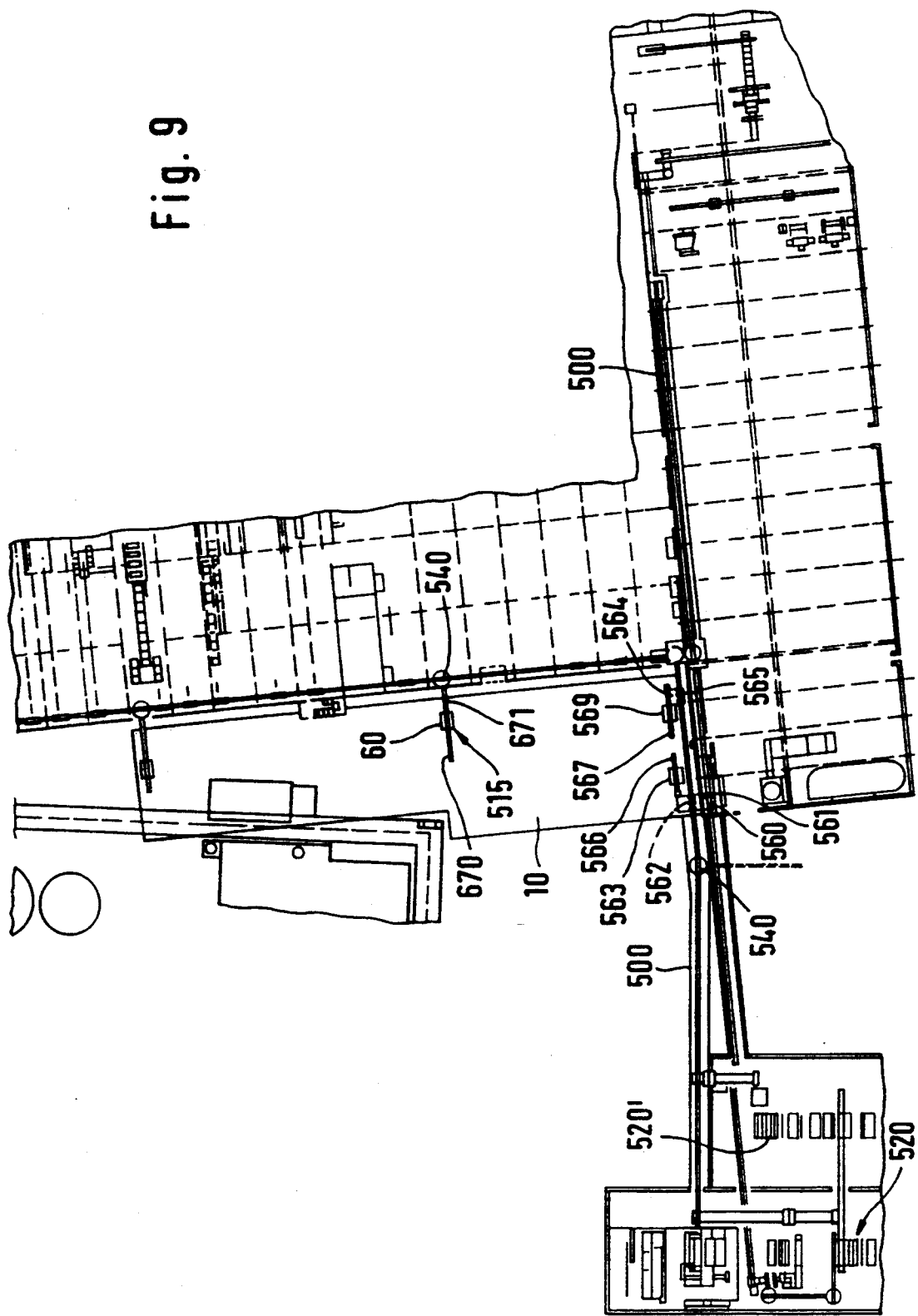
FIG. 9 shows an overall view of the high-shelf system store with supply paths for the paper rolls inserted in front of the same.
Figure 10:
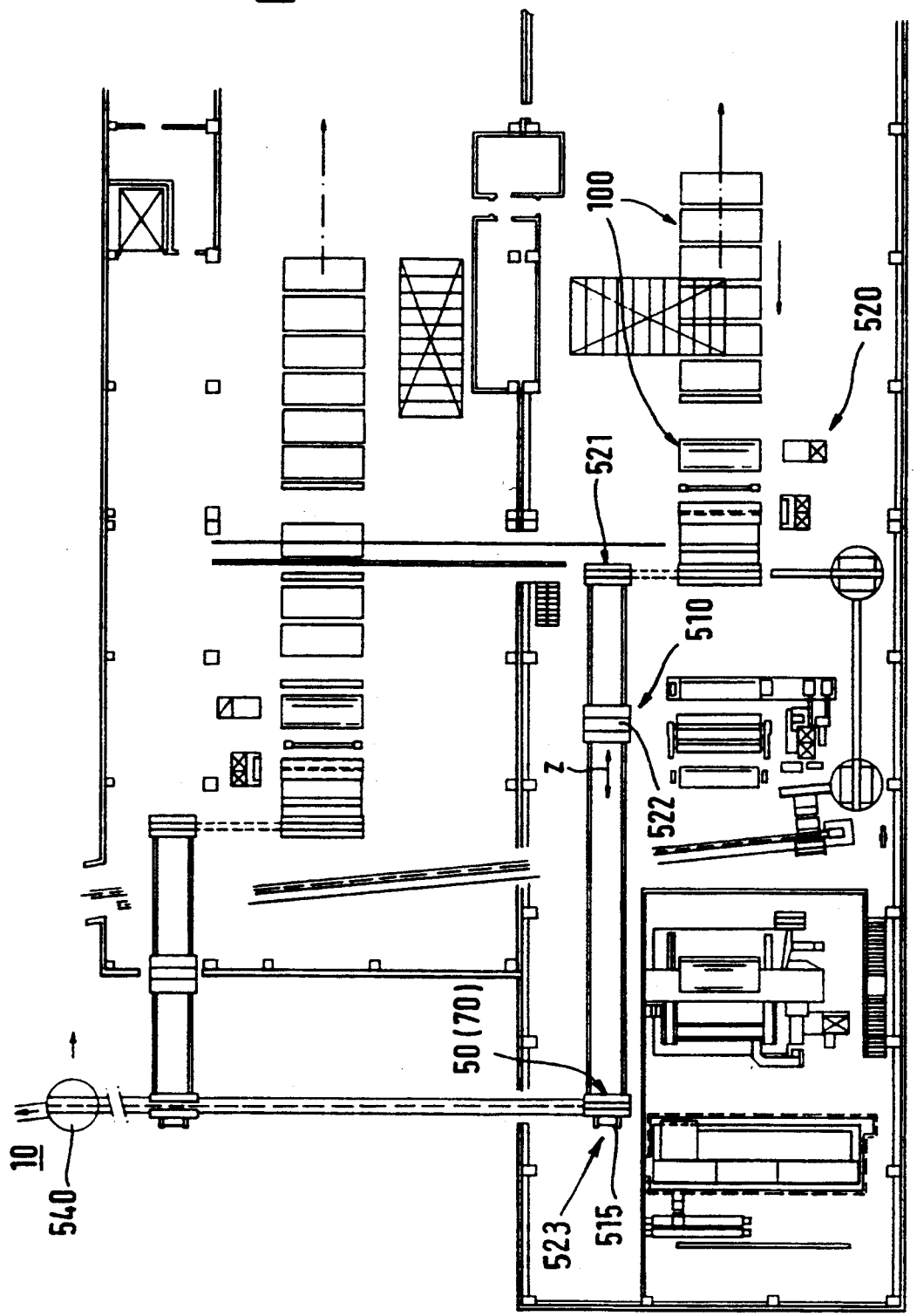
FIG. 10 shows an overall view of the high-shelf system store with supply paths and paper roll cutting means.

The FIG. 9 illustrates an overall view of an installation comprising a high-shelf system store 10 with supply paths 500 for the paper rolls 100. In this connection it will have to be taken into consideration that, in the least favorable case, the paper rolls coming up may have to be conveyed for storage into the high-shelf system store 10 in the form of a single roll. If the rolls are destined for the dispatch department, then it is possible to combine the rolls into conveying units which should not exceed a packing length of 3.2 meters.

Figure 11:
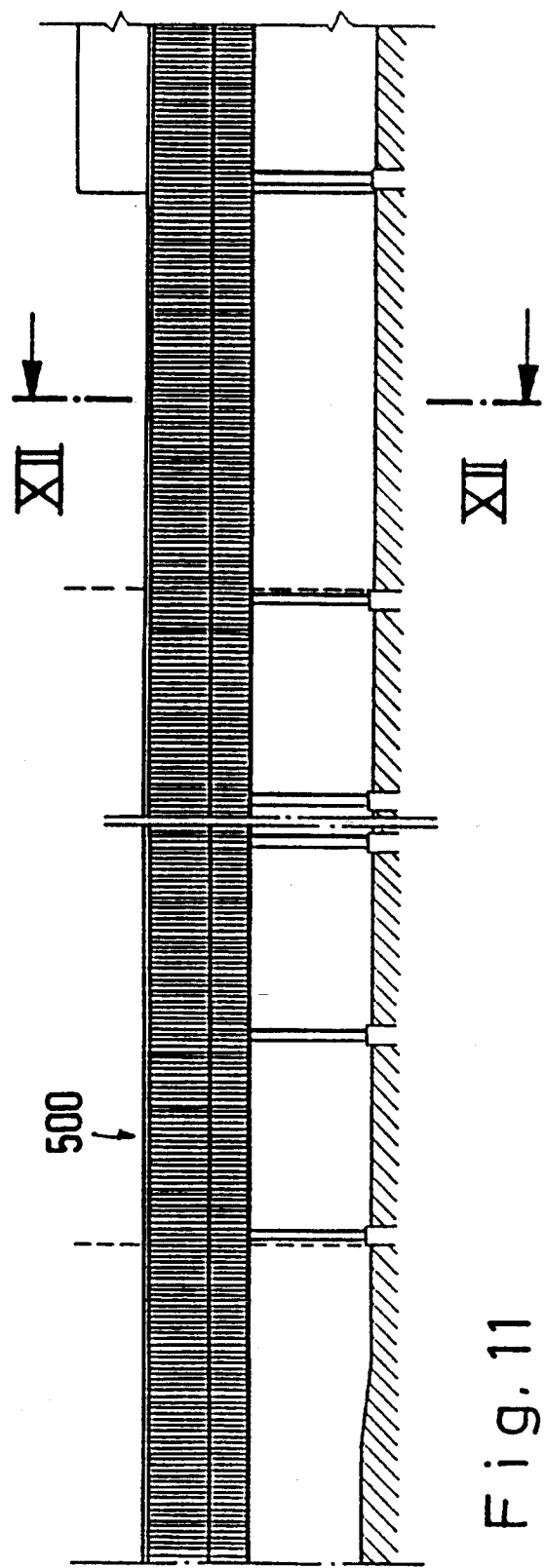
FIG. 11 shows, in a side elevation, a conveying bridge supplying the paper rolls to the high-shelf system store.
Figure 12:
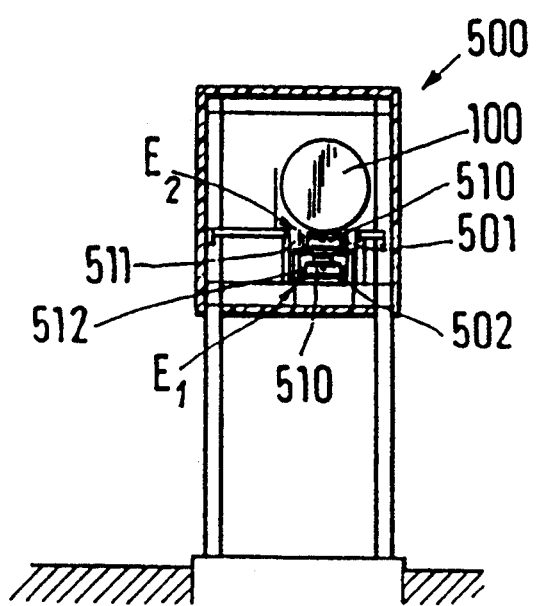
FIG. 12 shows a vertical section in the direction of line XII—XII in FIG. 11.

The conveyance of the paper rolls from the paper mill to the high-shelf system store 10 is taken care of by paper roll transporting cars 510 traveling independently of each other. These are transfer cars having their own driving means and control means which travel in double runway tracks 501,502 (FIGS. 11 and 12). In the lower plane E1, the transprting cars travel as an empty vehicle on the return journey and, in the upper plane E2, as a loaded vehicle. Following the unloading of the transporting car, the same is changed over at a point favorable from the point of view of material flow technique via an elevating station from the upper into the lower plane and is then able to travel back in the opposite direction. It is ensured hereby that the transporters 510 are in operation in a constant gyratory traffic according to source-target function and the respective frequency. The supply paths for the paper rolls are preferably constructed in the form of a conveying bridge (FIG. 11).

The bridgings of heights are effected by means of vertical conveyers 515 so that the paper rolls, after having been loaded onto the transporters are only moved again in the high-shelf system store.

The entire conveying path is supplied e.g. by thirteen transporting cars 510, it being assumed here that rolls that are destined for the high-shelf system store are moved in the form of single rolls. Transporting cars which charge the high-shelf system store, are changed over at the storing points direct so as to be speedily ready for receiving a further roll.

Should the rolls be destined for the dispatch department, in that case the travel takes place with the maximal loading unit which fits on a transporting car.

Since, parallel hereto, the crosscutter facilities 520 have to be supplied with paper rolls as well, still further transporting cars are required. The conveyance of paper rolls within the areas for storage and for removal from the store is likewise effected by transporting cars that are stationarily disposed in the vertical conveyer. The placing into storage and taking out of storage of the paper rolls in the high-shelf system store is carried out with the aid of traveling cars and satellite that are equipped with a control means of their own.

The overall installation is operated as detailed in the following:

The rolls coming from the roll cutting facility 520 are transferred onto a clock pulse-controlled carriage via the roll storage or repository station 521. The rolls are separated by two displaceable elevating girders which act independently of each other. Each elevating girder is equipped with a roll retaining means so as to secure the rolls against slipping out of position. It is hereby possible for individual rolls to be clocked, marked and ejected or to be marked singly and again be combined into loading units of maximally 3.2 m in length. In single rolls, the stamp is applied of the forward front side (in the direction of conveyance). In the case of loading units having to be clocked up, one roll each per cycle is stamped on the front side and another roll on the rear.

Once a loading unit is made up, then the same is tipped by the clocked carriage onto a shunting wagon 522 with a tipping means and catcher. Said carriage travels in the direction of arrow Z to the conveying path of the transporting cars and transfers the roll to the transporting car loading section and elevating station, which is indicated at 523. Here the transporting car travels underneath the roll, picks up the same with its hoisting means and travel on the upper runway track 501 to the predetermined destination (FIG. 12).

The roll cutting facilities 520,520' are provided with the same equipment. On the conveying path leading to the roll cutting facility 520', a revolving table 540 is provided which compensates the angle balance of approximately 6° between paper mill and equipment-/high-shelf system store and is also scheduled at the same time for the later connecting up of further roll cutting means to the conveying path (FIG. 9).

As seen in FIG. 9, paper rolls coming from the roll cutting facilities 520, 520' by means of transporting cars 510 are rolled, by means of an ejector 560, via the gravity path 561 with stopper and rolling aids, into an elevating station 562, wherein a transporting car 510 is standing. From this station the roll can be tipped either with the aid of the tipping means onto the gravity path leading further into the travel sections constructed in the form of catchers in front of the vertical conveyor or, with the aid of hydraulics, be lifted into the transporting car.

The transporter travels in the double-floor travel sections (FIG. 12) on the upper plane E1 in front of the gravity path 564. Here the roll is transferred by means of the ejector 565 via the gravity path with stopper into the travel section constructed in the form of catchers in front of the vertical conveyer 569. The transporting car is now raised in the elevating station onto the lower travel section plane and travels back to the elevating station 562; here it is again raised to the upper plane with the elevating station and is able to take over further rolls again. Two transporting cars are to be found in this circuit (FIG. 9).

The platform of the vertical conveyer 563 leads in front of extended travel section of the gravity path. The transporting car on the platform travels outwardly and underneath the roll, elevates its platform and thus takes over the roll; it then travels back to the vertical conveyer which now travels within the plane preset by the computer. The transporting car takes over the roll again, travels into the travel section 566 and puts down the roll on the section. This travel and supporting section serves as a stowage site. The transporting car travels back into the vertical conveyer and takes over the next roll within the storage plane.

It is possible to run the same operation also with the gravity path 564, the vertical conveyer 569 with the transporting car and the stowage site 567.

The shunting wagon 50 with the paper roll transporting car 70 now travels in front of the storage site, the paper roll transporting car travels below the roll, lifts up the same and travels back onto the shunting wagon, here the roll is put down onto the travel and supporting section of the shunting wagon during the displacement.

The shunting wagon now travels in front of the channel predetermined by the computer, the paper roll transporting car takes up the roll once more and travels into the store channel. Here it deposits the roll at the spot predetermined by the computer and then travels back onto the shunting wagon.

The removal from the store of paper rolls is effected in such a way that the shunting wagon 50 with the paper roll transporting car 70 travels in front of the shelf channel predetermined by the computer; the paper roll transporting car 70 travels into the lane, elevates its platform after having reached the storage site and thus takes over the paper roll, travels back to the shunting wagon and deposits the roll on the supporting sections of the shunting wagon. The shunting wagon travels on the tracks to a stowage site 670 in front of the vertical conveyer 60. The paper roll transporting car 70 lifts up the roll, travels into the travel and supporting section, puts down the roll and travels back to the shunting wagon. The latter now travels to the next shelf channel or to a vertical conveyer of the store in order to pick up a new roll.

The vertical conveyer 60 now travels within the same plane, the transporting car 70 of the vertical conveyer travels into the section; lifts up the roll, and travels back into the vertical conveyer. The same now travels into the storage plane, there the transporting car 510 travels with the roll into the travel section 671 and puts the roll down. Inside this travel section a transporting car 510 is moving which now takes over the roll, travels into the travel and supporting section of the revolving table 540 and deposits the roll there. The transporting car 510 travels back into the travel section.

The relocation for storage purposes of the paper rolls within a plane is possible with the aid of the shunting wagons and the paper roll transporting cars 70.

What is claimed is:

1. High-shelf system store for storage and removal from a store of roll-shaped material, more particularly of paper rolls which can be supplied in a lying position from a means for roll seizing via a store with shelf bays constructed in several floors, having tracks that are arranged in pairs for accommodation of paper roll transporting vehicles, in which each track of a pair of tracks attached on crossgirders of the framework structure of the store possesses an approximately U-shaped cross-sectional profile section with a lower chord and an upper chord and with a web interconnecting the lower chord with the upper chord, characterized in that:

a) the high-shelf system store (10) comprises one shelf portion (20) or two shelf portions while forming a distribution shaft (30) in shelf portions (20,120) disposed at a distance from each other with a plurality of shelf bays (26,126) disposed in a side-by-side and in a superposed arrangement on floors (21,22,23,24,25) with front-end openings (26a) or openings located within an area of the distribution shaft (30) and having a length corresponding to a length or a multiple of the length of a paper roll (100), wherein individual floors (21 through 25) of each shelf portion (20,120) of the two shelf portions (20;120) disposed on both sides of the distribution shaft (30) are located opposite the floors of the in each case other shelf portion;

b) on each floor (21;22;23;24;25) of each shelf portion (20;120) within an area of the front-end openings (26a) of each shelf bay (26,126), a horizontal conveying path (40;41;42;43;) proceeding transversely to a longitudinal direction of the shelf is disposed, wherein all conveying paths (40 through 43) terminate at one end in one elevator or, at both ends (40a, 41a, 43a; 40b, 41b, 42b, 43b) in one elevator each (60,160), each elevator comprising an elevator shaft (60',160') of a framework structure with a raisable and lowerable conveying platform (61;161) for the accommodation of at least one shunting wagon (50) with a paper roll transporting car (70) disposable thereupon;

c) the conveying paths (40 through 43) and the conveying platform (61;161) of each elevator (60;160) possess runway tracks (45,46;62,162) for the shunting wagons (50) of each conveying platform (61;161) with the runway tracks (45,46) of each conveying path (40;41;42;43) in a respective floor position of the conveying platforms (61,161) forming a continuous shunting wagon crossing area;

d) each shunting wagon (50) is provided with a paper roll transporting car (70) proceeding transversely to a forward movement of the shunting wagon which is displaceable on runway tracks (52) provided in the shunting wagon (50) and which is provided with a raisable and lowerable paper roll carrying plate (71) having a paper roll supporting area possessing a configuration of a graduated circle (72);

e) each shelf bay (26;126) is provided with a paper roll supporting beam 80 proceeding in a longitudinal direction of the shelf bay and stationarily mounted and fitted with running tracks (82,82') for the paper roll transporting car (70), in which case the paper roll supporting beam (80) comprises two tracks (83,84) disposed at a distance from each other, whose supporting areas (83a,84a) are constructed inclinedly toward each other in such a way that a storage area corresponding to a partial circumference of a paper roll is formed and whose distance from each other is dimensioned in such a way that the paper roll transporting car (70) is able to travel between the tracks (83,84) with the paper roll carrying plate (71) in the elevated position;

f) a driving means (65,165;55;75) for the displacement of the conveying platform (61,161) of the elevators (60,160), the shunting wagon (50) and the paper roll transporting car (70) are combined into a program control system (200), in which the individual shelf bays (26,126) are also stored;

g) the web (182) of each track (83;84) proceeds free of bends in a linear manner and is, with the aid of screwed, riveted or welded connections (183), connected to a plurality of vertical supporting girders (184) disposed at a distance from each other and connected to the crossgirder (12) of the framework structure (4) of the store;

h) a lower chord (181) is formed by the leg (187) with a horizontally proceeding section (187a) forming a support for the paper roll transporting car (70) and by a section (187b) adjoining said proceeding section (187a), said section (187b) proceeding vertically and parallel to the web (182), wherein the horizontal leg section (187a) is supported on and the vertical leg section (187b) is supported against an angle section (188) connected to the vertical supporting girder (184) and the cross-girder (12), the angle section (188) having a height greater than a length of the vertical leg section (187b) of the track (83,84); and i) an upper chord (180) is formed by a leg (185) which, in the direction of a support (187') of the lower chord (181), proceeds obliquely and which is adjoined by a section (185a) proceeding vertically and parallel to the web (182) of the track (83,84), wherein the vertical supporting girder (184) has a length which is shorter than a sum of lengths of the web (182) and of the angle section (188).

2. High-shelf system store according to claim 1, characterized in that the high-shelf system store (10) with its conveying paths (40 through 43) comprises a framework structure disposed on a base plate.

3. High-shelf system store according to either claim 1 or 2, characterized in that the distribution shaft (30) between two shaft portions (20,120) possesses a width which corresponds to a length of a paper roll (100).

4. High-shelf system store according to claim 1 wherein each shunting wagon (50) and each paper roll transporting car (70) carried in a piggyback fashion on the latter is provided with an electromotively operated traction motor.

5. High-shelf system store according to claim 1 wherein the paper roll carrying plate (71) of each paper roll transporting car (70) is vertically displaceable with the aid of a hydraulically or electromotively operated means.

6. High-shelf system store according to claim 1 wherein the leg (185) of the upper chord (180) and the track (83;84) exhibits an angular position of 65° relative to the web (182).

7. High-shelf system store according to claim 1 wherein the vertical supporting girder (184) of the track (83;84) is constructed in the form of a double T-section girder and is secured with its flanges (184a,184b) to the web (182).

8. High-shelf system store according to claim 1 wherein the angle section (188) of the track (83;84) extends over an entire length of the lower chord (181).

9. High-shelf system store according to claim 1 wherein the attachment of the web (182) of the track (83;84) is effected within a top area of the supporting girder (184).

10. High-shelf system store according to claim 1 wherein the attachment of the web (182) of the track (83,84) is effected over the entire length of the supporting girder (184).

11. High-shelf system store according to claim 1 wherein the elevator shaft (60';160') is disposed stationarily at the one end of the conveying paths (40 through 43).

12. High-shelf system store according to claim 1 wherein the elevator shaft (60) is disposed laterally in front of the distribution shaft (30), and wherein the conveying paths (40 through 43) proceeding in front of the shelf portions (20;120) are connected via the conveying paths (46 through 49) proceeding transversally to the same to the elevator shaft (60'; 160').

13. High-shelf system store according to claim 1 wherein the elevator shaft (60';160) is disposed within or in front of the distribution shaft (30).

14. High-shelf system store according to claim 1 wherein supply paths (500) with automotive paper roll transporting cars (510) displaceable on the latter are inserted in front of the high-shelf system store (10), in which each supply path (500) is constructed so as to have two floors with superjacent travel paths (511,512) for the paper roll transporting cars (510), and in that each supply path (500) terminates in an elevator shaft (60';160) of the high-shelf system store (10), in that, if necessary, in order to bridge differences in height, vertical conveyers (515) are disposed in the supply path (500) and in that the supply path (500) interacts with means for cutting a paper roll means (520), paper roll packaging machines (530) and with revolving tables (540).

15. Track arranged in pairs in stores, more particularly in high-shelf system stores, having shelf bays constructed in several floors for the accommodation of roll-shaped storage material, more particularly paper rolls and of paper roll transporting cars, wherein each track of a pair of tracks attached to crossgirders of a framework structure of a store possesses an approximately U-shaped cross-sectional configuration with a lower chord and an upper chord and with a web that interconnects the lower chord and the upper chord, characterized in that:
  a) the web (182) of the track (83;84) proceeds devoid of any bends linearily and, with aid of screwed, riveted or welded connections (183) is connected to a plurality of vertical supporting girders (184) which are disposed at a distance from each other and connected to the crossgirder (12) of the framework structure (4) of the store;
  b) the lower chord (181) is formed by a horizontally proceeding leg (187) with a section (187a) forming the support for the paper roll transporting car (70) and a section (187b) adjoining the first section (187a) which proceeds vertically and parellelly to the web (182), wherein the horizontal leg section (187a) is supported on and the vertical leg section (187b) is supported against an angle section (188) connected with the vertical supporting girder (12) and having a height greater than the length of the vertical leg section (187b) of the track (83,84);
  c) the upper chord is formed by a leg (185) which proceeds obliquely in the direction of the support (187') of the lower chord (181) and to which a section (185a) adjoins which proceeds vertically and parellelly to the web (182) of the track (83,84), wherein the vertical supporting girder (184) has a length which is shorter than a sum of lengths of the web (182) and of the angle section (188).

16. Track according to claim 15, wherein the leg (185) of the upper chord (180) exhibits an angular position of 65° relative to the web (182).

17. Track according to either claim 15 or 16, wherein the vertical supporting girder (184) is constructed in the form of a double T-section girder and, with its flanges (184a), is secured to the web (182).

18. Track according to claim 15 wherein the angle section (188) extends across an entire length of the lower chord (181).

19. Track according to claim 15 wherein the attachment of the web (182) of the track (83;84) is effected within an upper area of the supporting girder (184).

20. Track according to claim 15 wherein the attachment of the web (182) of the track (83;84) is effected across an entire length of the supporting girder (184).

* * * * *